Fig.1

Sept. 30, 1969 V. J. JANOVTCHIK ET AL 3,469,327
FREEZE DRYING APPARATUS
Filed Dec. 5, 1967 8 Sheets-Sheet 3

Inventors
Viacheslav Jansen Janovtchik
and Camillo Catelli
By
Morrison, Kennedy Campbell
Attorneys 3,469,327
FREEZE DRYING APPARATUS
Viacheslav Jansen Janovtchik, London, England, and Camillo Catelli, Parma, Italy, assignors to H. J. Heinz Company Limited
Filed Dec. 5, 1967, Ser. No. 688,210
Claims priority, application Great Britain, Dec. 7, 1966, 54,835/66
Int. Cl. F26b *15/12, 19/00*
U.S. Cl. 34—92        14 Claims

ABSTRACT OF THE DISCLOSURE

Apparatus for the continuous drying of frozen products in containers comprises a vacuum chamber through which the containers are advanced from an entrance airlock to an exit airlock. A series of parallel heating plates extend through the chamber, which plates are one above another and define a tortuous path along which the containers are pushed, and transfer devices are mounted relative to the ends of the heating plates to transfer a container from one heating plate to the next in said path after a container has been introduced into the chamber.

BACKGROUND OF THE INVENTION

Field of the invention

This invention relates to apparatus for the drying of frozen products. The products to be dried may, for example, be foodstuffs, or biological or pharmaceutical preparations.

Description of the prior art

The drying of products by the sublimation of ice from the frozen products is a known process for producing dehydrated products. Usually this process is carried out as a batch process in which foodstuffs, for example, are loaded on trays and are placed in a vacuum chamber where they remain for a drying period of several hours.

The output from a batch process of this kind is low since its operation is discontinuous and a considerable amount of time is lost on loading and unloading. It is a main object of the present invention to overcome the deficiencies of the known apparatus by providing apparatus for carrying out a completely continuous process for the freeze drying of frozen products.

SUMMARY

According to the invention apparatus for the continuous drying of frozen products in containers comprises a vacuum chamber having outlets for connection to vacuum and vapor condensing equipment, at least one heating plate fixed in the chamber and defining a path for containers as they are moved through the chamber, an entrance airlock at one end of said chamber, charging means associated with said entrance airlock for introducing containers through the airlock onto a heating plate at the beginning of said path, means operable from outside the chamber for moving the containers along the said path, and exit airlock at the other end of the chamber, and discharge means associated with said exit airlock for moving the containers into said exit airlock from a heating plate at the end of said path.

When there is only one heating plate the means for moving the containers along a plate may also function as the means for moving the containers into the exit airlock. However, in another form of the invention there is a series of heating plates fixed in the chamber one above the other, the containers being moved along a path extending from one heating plate to another.

In this embodiment of the invention the heating plates are preferably fixed parallel to one another in the vacuum chamber and the entrance airlock is located opposite one end of the topmost or lowest plate while the exit airlock is located opposite the other end of the lowermost or topmost plate. This arrangement ensures the longest possible path for the containers of products over the heating plates in the vacuum chamber.

The heating plates may be heated to a required temperature in any convenient manner through connections made through the wall of the vacuum chamber. The temperature of the plates varies from plate to plate and usually the temperature is highest at the beginning of the path, and falls gradually to a predetermined lower level towards the end of the path. The heating medium may, for example, be steam, water, high boiling point liquids or electrical heating incorporated in the heating plates. For the circulation of steam, water or other heating liquids through the heating plates the plates will have a suitable hollow construction or have heating pipes incorporated in the plates.

Further according to the invention transfer devices are mounted relative to the ends of the plates and are operable to transfer a container from one plate to the next in said path after a container has been introduced into the chamber.

The arrangement of the series of heating plates may be such that the containers are moving from the uppermost plate to the lowest plate or alternatively through a path commencing with the lowermost plate and concluding with the uppermost plate.

It is to be understood that while reference is made to the movement of individual containers, there may be plurality of containers which are moved into, through and out of the apparatus as one unit.

The containers of products to be dried are gradually moved along the heating plates and are in thermal contact with the plates so that the required amount of heat to cause sublimation of ice is applied to the frozen products as they move over the heating plates.

The conditions are such that all the ice and most of the absorbed moisture have been removed from the products by the time the containers reach the exit end of the heating plates. Each container is in the vacuum chamber for several hours as it is moved along the continuous path, and when the apparatus is in full operation a container of dried products is removed through the exit airlock about every two minutes, for example. Containers of frozen products to be dried are pushed onto the first of the heating plates at the same rate.

In order to ensure the movement of the containers in their continuous path along the whole length of the plates the transfer devices mounted relative to the ends of the plates and which transfer the containers from one plate to the plate above or below, comprise supports for the containers respectively mounted at alternate ends of the heating plates, and in the embodiment of the invention in which the entrance airlock is opposite the uppermost heating plate there is no transfer device mounted at the end of the uppermost plate and each transfer device is operable to raise its support to the level of the end of the overlying plate to receive a container conveyed from the end of that plate onto the support, and then to lower the support with the container to the level of the heating plate at which he transfer device is mounted.

In this way the support is raised to the level of the plate above before a container on the plate above is pushed along that plate onto the support and when this operation has been effected the transfer device lowers that container to the level of the plate below and the container so carried is then pushed onto the plate below to continue its travel along the heating plates.

In order to move the containers along the heating plates two sets of push bars are provided mounted inside the chamber at opposite ends of the chamber, one set of push bars being arranged to engage containers on the first and subsequent odd-numbered heating plates, and the other set of push bars is arranged to engage containers on the second and subsequent even-numbered heating plates, and operating means are provided outside the chamber for operating both sets of push bars alternately in sequence.

When in normal operation the vacuum chamber is full of containers of products to be dried and these containers are all in abutment with each other on the heating plates then the forward operation of the first set of push bars which takes place after the transfer devices at the ends of the even-numbered plates have been raised to the level of the odd-numbered plates pushes the containers along by the length of one container so that a container is pushed onto the transfer device raised at the end of each of the odd-numbered plates by means of which containers are then transferred from the odd-numbered plates to the even-numbered plates by the return operation of the first set of push bars.

The operation of the second set of push bars moving in the opposite direction to the first set transfers the containers in the same way from the even-numbered heating plates to the odd-numbered plates. Operation of the first set of push bars provides room for a fresh container to be inserted from the entrance airlock to the beginning of the path and at the same time a container of dried products is pushed into position at the end of the path for removal through the exit airlock.

The transfer devices may be operated by a separate mechanism from the push bars but it is desirable, in view of the requirement for maintaining a high vacuum in the vacuum chamber, to have as few as possible operating elements extending through the walls of the vacuum chamber and for this reason the arrangements for operating the push bars are located inside the vacuum chamber and operated through a single operating device at each end extending through and sealed into the wall of the vacuum chamber. Preferably the transfer devices are operated by the same means as operates the push bars and from this aspect of the invention the first set of push bars includes actuating means engaging the transfer devices on the even-numbered heating plates in order to raise their container supports to the level of the ends of the odd-numbered plates before the push bars engage the containers on the odd-numbered plates, and the other set of push bars includes actuating means engaging the transfer devices on the odd-numbered plates to raise their container supports to the level of the ends of the even-numbered plates before the push bars engage the containers on the even-numbered plates.

In a preferred embodiment of the invention the heating plates are all of equal length but are mounted in staggered relation so that the ends of the even-numbered plates all protrude beyond the ends of the odd-numbered plates at the end of the chamber opposite to the entrance airlock, and the protruding end of each of the plates, except the first, has one of said transfer devices mounted on it so that the container support of each transfer device can be raised and lowered between the level of the heating plate to which it is connected and the level of the plate above.

Further according to the invention each transfer device may include a container support frame connected at both sides to a heating plate by pivoted links, one link at each side carries a cam roller for engagement by cam surfaces at the ends of actuating arms extending along the sides of said heating plate, and including means for advancing the arms in order to raise the support frame to the level of the plate above prior to the pushing of the containers along that plate, and for retracting the arms to lower a container to the level of the plate to which the support frame is linked.

According to the invention, when the movement of the containers is from the uppermost heating plate to the lowermost, the actuating arms engaging the transfer devices on the odd-numbered heating plates are connected to the set of push bars for the even-numbered heating plates and the actuating arms engaging the transfer devices on the even-numbered heating plates are connected to the set of push bars for the odd-numbered heating plates, the cam surfaces on the actuating arms being arranged so that lifting of the support frames is completed before the push bars engage the containers. The containers which are in abutment with each other may be slid along the heating plates as they are pushed by the sets of push bars. In a modification of the invention there are arms extending along both sides of each heating plate and connected by parallel linkages to the plate below, support rollers mounted on the arms, a cam roller on each link of the linkages, and cam surfaces formed on said actuating arms to engage said cam rollers and move the linkages so that upon operation of the appropriate set of push bars the support rollers are raised above the level of the top surface of the heating plate and lift containers off the heating plate before they are pushed along by the push bars.

In another embodiment of the invention when the movement of the containers is from the lowermost heating plate to the uppermost each transfer device includes a container support frame connected at both sides to a heating plate by pivoted links, and at each end of the vacuum chamber all the support frames are connected together by a batten which is pivotally connected to a linkage rotatable about a fixed pivot and carrying a cam roller which engages a cam surface on an actuating arm connected to the push bar actuating means at that end of the chamber, which cam surface has a sloping portion arranged to cause, through said linkage, the raising of the batten thereby raising all the support frames to the level of the plates above prior to the pushing of containers from the support frames on to the heating plates by the push bars.

That is the transfer devices attached to the odd-numbered heating plates are lifted upwardly by the action of the actuating means for the push bars co-operating with the even-numbered plates, and the transfer devices attached to the even-numbered plates are raised as the push bars co-operating with the odd-numbered plates are moved forwardly.

The vacuum chamber is connected to vacuum apparatus for maintaining the vacuum in the chamber and is also connected to vapour removing equipment of known design in which water vapour produced in the vacuum chamber by sublimation of ice from the frozen products condenses. The vapour removing equipment may take the form of a refrigerated surface and the condensation of water vapour on this surface ensures the migration of water vapour from the neighbourhood of the containers to the vapour removing equipment. In order to maintain maximum efficiency when using refrigerating equipment for vapour-condensation it is necessary to defrost the equipment at intervals and to ensure that this can be done without interrupting the continuous drying of products in the apparatus the vacuum chamber may have one or more outlets for respective connection to one or more sets of vapour condensing equipment, and each outlet is provided with a valve so that the sets of condensing equipment can be used alternately. That is when one set is being used for condensing water vapour the other set is being defrosted. In another arrangement the vacuum chamber may be connected to a continuous type vapour condensing equipment in which ice is removed continuously from a refrigerated surface, or to a set of steam ejectors.

Further according to the invention the vacuum equipment is connected to the vacuum chamber through the same outlets as connect the vacuum chamber to the vapour removing equipment.

In the preferred embodiment of the invention each airlock has two sealing doors respectively sealing the airlock from the ambient atmosphere and from the interior of the vacuum chamber, and outlets with sealing valves one for connection to the vacuum equipment and the other for opening the airlock to the ambient atmosphere.

A push bar mechanism is provided inside the entrance airlock which mechanism is operable from outside the airlock, when the airlock is evacuated and the communicating door is opened, to push a container in the airlock onto the first heating plate in the vacuum chamber. Further a second push bar mechanism is mounted in the vacuum chamber opposite to the exit airlock and is operable from outside the vacuum chamber when the exit airlock is evacuated and the communicating door is opened, to push a container of dried products off the last heating plate into the exit airlock. When the vacuum has been released in the exit airlock the container may be removed by hand or by employing a further push bar mechanism mounted in the exit airlock.

Normally containers of products which are already frozen are placed in the entrance airlock for movement onto the heating plate in the vacuum chamber but in a modified arrangement according to the invention refrigerating means may be included in the entrance airlock to freeze products in a container before the container is conveyed into the vacuum chamber. The refrigerating means may act directly on the container of products by thermal contact, or the products in the container are frozen by partial evaporation of water from the product under the influence of the vacuum which is established in the airlock once the airlock has been sealed from atmosphere.

BRIEF DESCRIPTION OF THE DRAWINGS

In the drawings the same references indicate the same or similar parts.

DESCRIPTION OF THE PREFERRED EMBODIMENT

Figure 1:
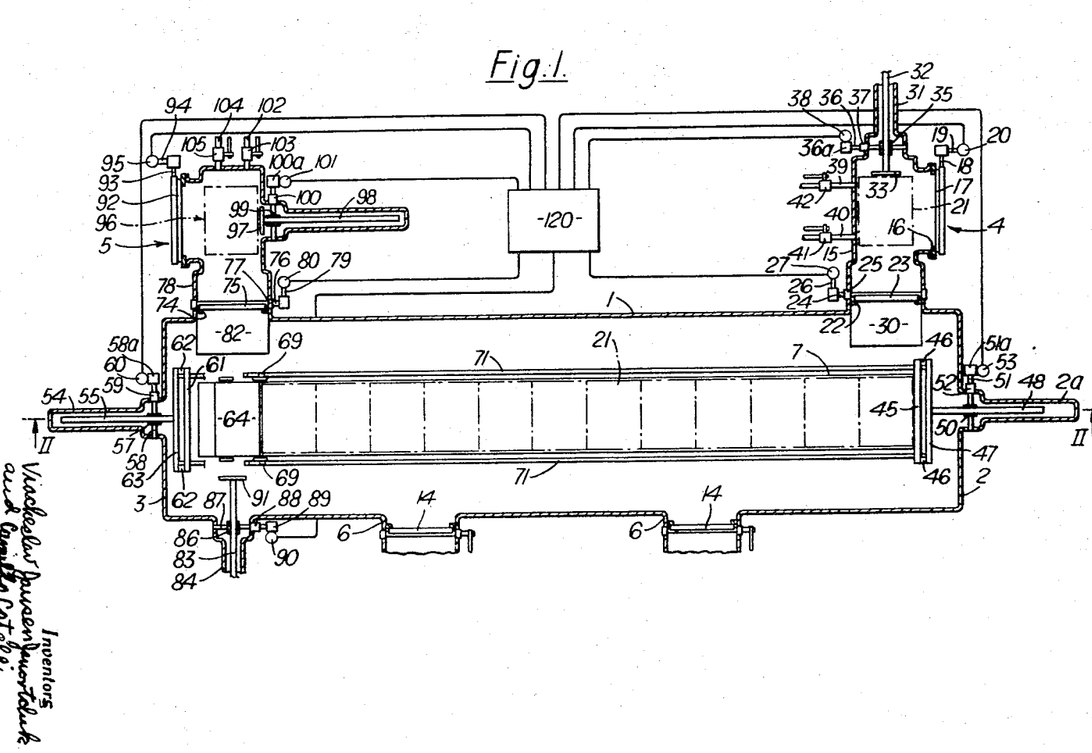
FIG. 1 is a horizontal section through one embodiment of a continuous freeze drying apparatus according to the invention.

Referring to FIGS. 1 to 4 of the drawings apparatus according to the invention for the continuous freeze drying of frozen products comprises a vacuum chamber 1 of cylindrical form. The vacuum chamber is closed at its end by end plates 2 and 3, which may be made removable, and to one side of the vacuum chamber as shown in FIG. 1 there is an entrance airlock indicated generally by the reference 4 and an exit airlock indicated generally by the reference 5.

At the opposite side of the cylindrical outer wall of the vacuum chamber 1 there are two outlets 6 closed by valves in the form of sealing doors 14, for connection to vacuum and vapour removing equipment, of known kind, which is not described herein in detail since its construction forms no part of the present invention.

Figure 2:
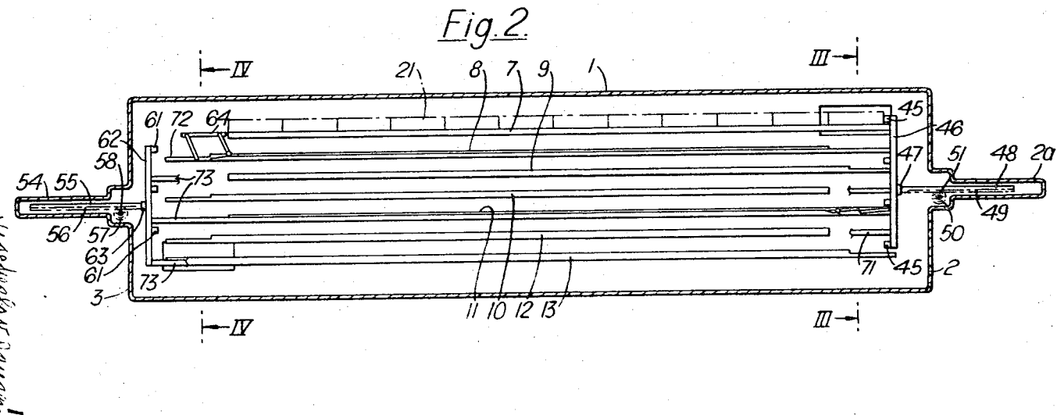
FIG. 2 is a section on line II—II of FIG. 1 showing the disposition of heating plates in the apparatus.

Inside the vacuum chamber there are a series of heating plates 7 to 13 fixed above one another and in parallel relationship. These heating plates define a path for containers of products to be dried which containers are moved into the chamber through the entrance airlock 4 and leave the chamber through the exit airlock 5 having meanwhile traversed the path defined by the series of heating plates. The entrance is airlock 4 located near the end wall 2 of the vacuum chamber and opposite one end of the topmost heating plate 7 as shown in FIG. 2, while the exit airlock 5 is located near the end wall 3 of the vacuum chamber and opposite the one end of the lowermost plate 13 as also shown in FIG. 2.

The entrance airlock 4 has a shaped outer wall 15 and in one side of the wall 15 there is a rectangular inlet 16 which is closed by a sealing flap door 17. The top of the flap door is fixed to a pivot rod 18 connected by a lever 19 which is connected to the piston rod of a hydraulic motor in the form of a two-way piston and cylinder indicated generally at 20. The pressure fluid supply to the motor 20 normally maintains the door 17 pressed into sealing engagement with the inlet 16, and when the motor is reversed the flap door 17 pivots upwardly to the position indicated at 18a in FIG. 6 so that a container 21 of frozen products to be dried can be placed in the entrance airlock.

Figure 5:
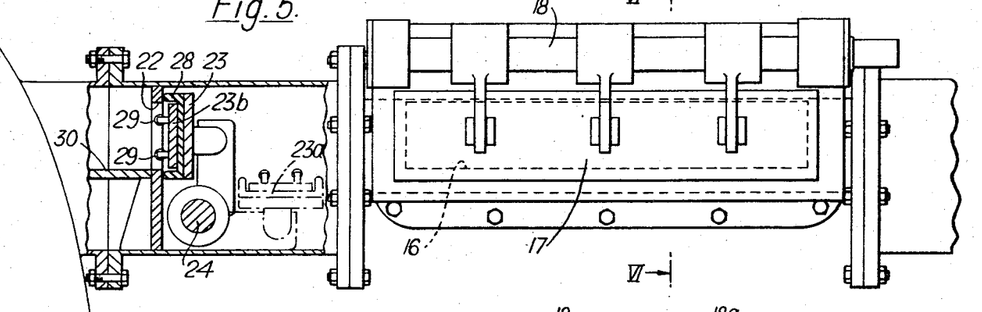
FIG. 5 is a side elevation, partly in section, of the entrance airlock.
Figure 6:
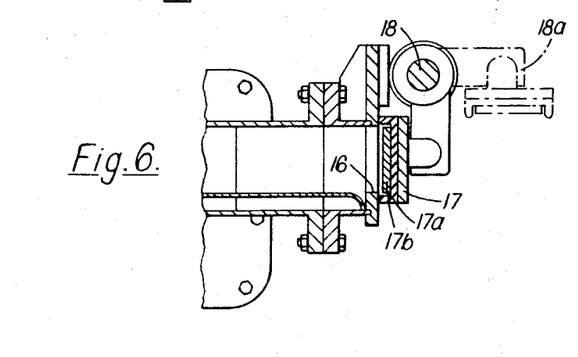
FIG. 6 is a section on line VI—VI of FIG. 5.
Figure 7:
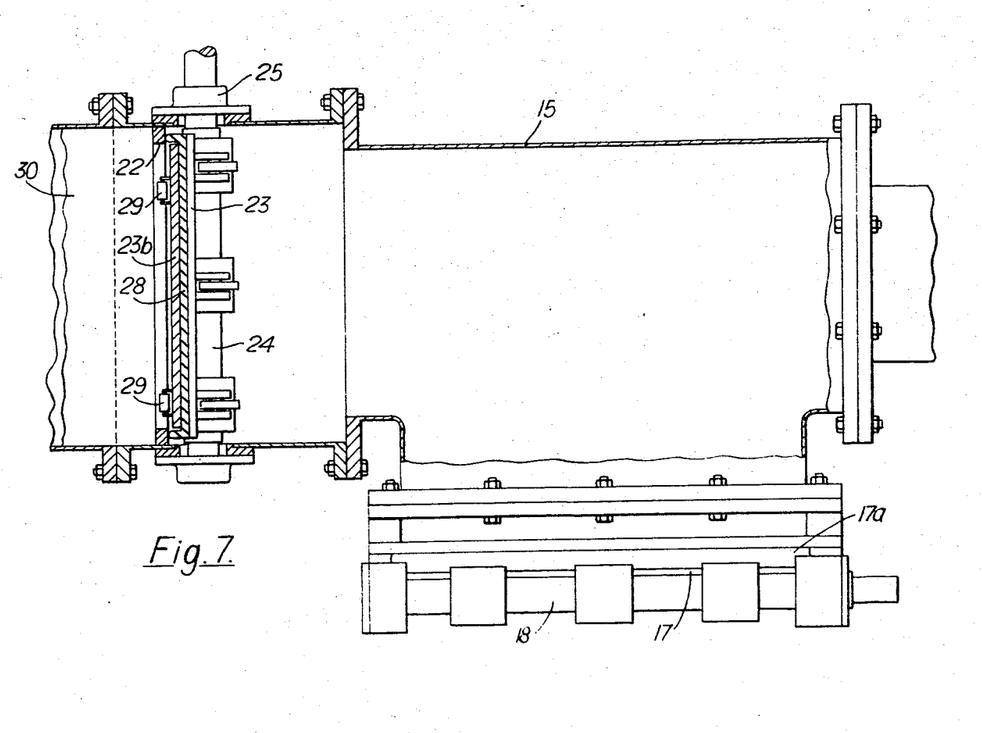
FIG. 7 is a plan view of the entrance airlock.

Detailed views of the construction of the flap door 17 are given in FIGS. 5, 6 and 7. The door 17 embodies a rubber seal 17a held in position by a plate 17b.

The entrance airlock communicates with the main vacuum chamber through an inlet 22 also of rectangular form to permit the passage of the container 21, and normally sealed by a flap door 23 which is mounted on a pivot rod 24 which passes through a sealing bearing 25 in the wall 15 of the entrance airlock. The pivot rod 24 is connected through a lever 26 to the piston rod of a two-way piston and cylinder hydraulic motor 27. The door 23 pivots downwardly to the position shown at 23a in FIG. 5 and includes a rubber seal 28 held by a plate 23b. Normally the door 23 is held by the motor 27 in sealing engagement with the inlet 22 and when a container 21 is to be moved into the vacuum chamber from the airlock the door is pivoted downwardly to open the inlet 22 and the container can run over rollers 29 mounted on the plate 23b and an apron 30 mounted just inside the inlet 22 (see FIG. 3) during its passage on to the end of the first of the heating plates 7.

The outer end of the wall of the entrance airlock is elongated to form a vacuum-tight casing indicated at 31 to house a push rod 32 which carries a flat pusher 33 at its inner end for engaging the back face of a container 21. The rod 32 has rack teeth indicated at 34 (FIG. 3) on its lower surface and these teeth engage a pinion 35 which is fixed to a shaft 36 which passes through a sealing bearing 37 in the wall 15 of the entrance airlock and is driven through gearing 36a by a hydraulic motor 38. There are also two outlets 39 and 40 in the wall of the entrance airlock. The outlet 40 is connected to vacuum equipment through a sealing valve 41 and the outlet 39 can be opened to the ambient atmosphere by opening its sealing door 42.

Figure 3:
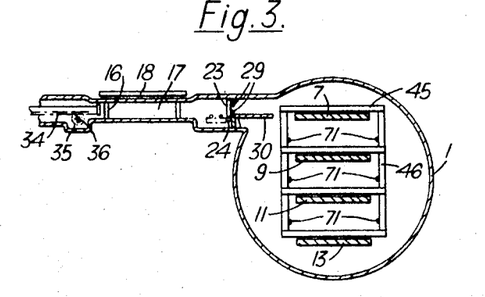
FIG. 3 is a section on line III—III of FIG. 2 showing the arrangement of the entrance airlock with a push bar mechanism for moving containers on to the heating plates from that airlock.

In operation when a container is to enter the plant the entrance airlock is first isolated from the vacuum chamber 1 by operating the motor 28 to maintain the flap door 23 closed. The outlet 40 from the airlock to the vacuum equipment is then sealed by closing the valve 41 and the vacuum inside the airlock is broken by opening the valve 42 which communicates with the outside atmosphere. The flap door 17 is then opened, by operation of the motor 20, a container 21 is introduced into the entrance airlock and the door 17 and the valve 42 are closed. The valve 41 is then opened so that a vacuum is applied to the airlock to put the airlock under the same vacuum as that prevailing inside the vacuum chamber 1. When this is achieved the flap door 23 is opened, the motor 38 of the push bar mechanism is operated and the pusher 33 pushes the container 21 over the rollers 29 on the lowered flap door 23 and the apron 30 on to the first heating plate 7. The flap door 23 is then closed, the valve 41 is closed and the valve 42 is opened to release the vacuum, and the entrance airlock is then ready for use to introduce another container of products to be dried in to the apparatus.

The vacuum chamber is maintained at a very low pressure for example of the order of 1 millimetre of of mercury by means of the vacuum equipment which is connected to the vacuum chamber through the same ducts 6 as the vapour condensing equipment. The water vapour pressure of frozen products being dried by sublimation is however higher and it is the pressure gradient through the apparatus which ensures that there is a continuous migration of water vapour from the region of the containers in the vacuum chamber 1 to the condensing equipment where the water vapour is removed.

Means are provided in the vacuum chamber for moving the containers along the heating plates and as shown in FIGS. 1 and 2. The means for moving the containers comprises push bars mounted inside the chamber at opposite ends of the chamber. At the right hand end of the chamber as illustrated in FIGS. 1 and 2 near to the entrance airlock the end wall 2 of the vacuum chamber is formed with an outwardly extending and central hollow tube 2a to accommodate push bar equipment.

The set of push bars mounted adjacent the wall 2 are for engaging containers on the first of the heating plates 7 and on subsequent odd-numbered heating plates 9, 11 and 13. The push bars 45 are mounted as cross members between two side struts 46 which are connected centrally by a strut 47 which is fixed to one end of a push rod 48 which is housed in the casting 2a and whose undersurface is formed with rack teeth 49 which mesh with a pinion 50 mounted on a shaft 51 which extends through a sealing bearing 52 in the wall of the casing 2a. The shaft 51 is connected through gears 51a to a hydraulic motor 53 in the form of a two-way piston and cylinder which can be driven forwardly or in reverse in order to move the push rod 48 by a fixed distance appropriate for the movement of the containers along the heating plates by the length of one container.

When the push rod 48 moves into the vacuum chamber one of the push bars 45 engages the side of the container 21 to push that container along the plate 7 by a distance sufficient to allow another container to be moved into the vacuum chamber from the entrance airlock and on to the plate 7. At the same time, the apparatus being full of containers, the push bars 45 opposite the odd-numbered heating plates 9, 11 and 13, also slide the end containers along those plates from right to left by the same distance.

At the other end of the vacuum chamber mounted in a tube 54 formed in the end wall 3 of the vacuum chamber there is a further push rod 55 which is formed as a rack with teeth 56 meshing with a pinion 57 mounted on a shaft 58 which extends through a sealing bearing 59 in the wall of the casing 54 and is connected through gears 58a to the output of another reversible hydraulic motor 60. A second set of push rods 61 are mounted between side struts 62 which are held together by a cross strut 63 which is fixed to the end of the push rod 55. In the particular embodiment described there are only three push rods 61 at the left hand side of the apparatus and these push bars co-operate with the even-numbered plates 8, 10 and 12 to push from left to right the end containers on those plates by the distance equal to the length of one of the containers.

As shown in FIG. 2 the heating plates which may be made of several units are all of equal length and are mounted in staggered relation so that the ends of the even-numbered plates 8, 10 and 12 all protrude to the left beyond the ends of the odd-numbered plates 7, 9, 11 and 13 that is at the end of the vacuum chamber opposite to the entrance airlock 4. The ends of the odd-numbered plates 7, 9, 11 and 13 all protrude beyond the even-numbered plates at the right hand end of the vacuum chamber adjacent the entrance airlock.

Means are provided for transferring containers from one heating plate to another. In the embodiment described mounted on the protruding end of each of the heating plates, except the first plate 7, there is a transfer device which is operable to transfer a container from one plate to the next below, so as to maintain the continuous path of the containers along the heating plates. A transfer device mounted on the protruding end of the heating plate 8 is shown in its raised position in FIG. 2 and the transfer device mounted at the end of the heating plate 11 is shown in its normal position lying flat relative to the heating plate.

Figure 8:
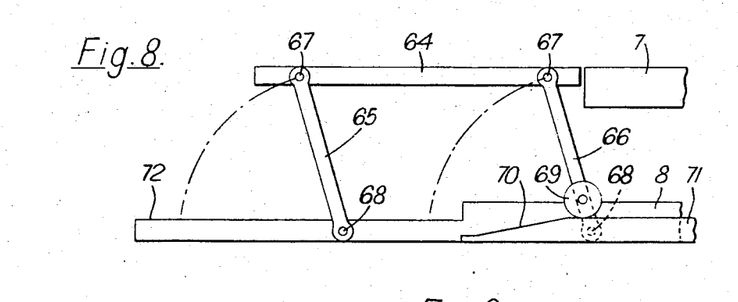
FIG. 8 is a detailed view of one type of a transfer device mounted at one end of one of the heating plates which transfer device is also shown in FIGS. 1 and 2.

One of the transfer devices is illustrated in greater detail in FIG. 8 and includes a container support frame 64 which is connected at both its sides to the protruding end of a heating plate shown as plate 8 in FIG. 8 by pivoted links 65 and 66. These links are parallel to each other and are fixed by pivot pins 67 and 68 to the support frame and to the heating plate respectively. As shown in FIG. 1 the support frame 64 is of rectangular shape open at the side facing the oncoming containers and its dimensions are such that it receives snugly a container pushed along the heating plate 7 by the operation of the set of push bars 45.

The pair of pivoted links 66 each carry a cam roller 69 near its lower end, and these cam rollers 69 are engaged by wedge shaped cam surfaces 70 at the ends of actuating arms 71 extending along both sides of the heating plate 8. When the actuating arms 71 are moved towards the end of the heating plate, from right to left as shown in FIG. 8, the rollers 69 ride up the surfaces 70 and thereby cause the links 65 and 66 to pivot so that the support frame 64 is raised from its normal flat position in which the frame lies in a rabbet 72 cut in the protruding end of the plate 8 to receive the frame 64. When the cam rollers 69 have moved right up the surfaces 70 the support frame 64 is at the level of the heating plate 7 so that the end container on the heating plate 7 is pushed along that heating plate by operation of the push bars 45 into the support frames 64.

In order to ensure the raising of the support frame 64 prior to the pushing of the containers along the heating plate 7 the actuating arms 71 are preferably operated by the same mechanism as the push bars 45. This has the added advantage that no additional driving connection is necessary through the wall of the vacuum chamber, it being desirable to keep the sealed connections through the walls of the vacuum chamber to a minimum.

The actuating arms 71 which extend along the sides of each of the even-numbered heating plates 8, 10 and 12 are connected to the side struts 46 which hold the set of push bars 45. The arrangement of these arms 71 is such that when the push rod 48 is moved inwardly the cam rollers immediately begin to ride up the cam surfaces 70 so that the support frames 64 which are pivotally mounted on the ends of the even-numbered heating plates 8, 10 and 12 are already raised to the level of the ends of the heating plates 7, 9 and 11 by the time the push bars 45 begin to move the containers along the odd-numbered heating plates 7, 9 and 11. When the inward movement of the push rod 48 is completed a container is freely carried on the support frame 64 and when the push rod 48 is then retracted the support frame is lowered as the cam rollers 69 run down the cam surfaces 70. The frame 64 then sinks into its rabbet 72 and the container on the support frame 64 is on a level with the upper surface of the heating plate 8.

The push rod 55 is then moved inwardly from left to right and the push bars 61 engage the containers on the even-numbered plates 8, 10 and 12. The container on the support frame 64 is then pushed off the frame 64 and along the heating frame 8 so that the frame can be raised to receive another container from the plate 7 in the next cycle of operation.

There are actuating arms 73 similar to the arms 71 extending along the sides of the odd-numbered heating plates 9, 11 and 13 and these actuating arms 73 are all connected to the support struts 62 for the push bars 61. Just before the push bars 61 engage the containers at the left hand ends of the even-numbered heating plates 8, 10 and 12 the actuating arms 73 raise the transfer devices from the right hand ends of the odd-numbered heating plates 9, 11 and 13 so that they are ready to receive containers from the right hand ends of the even-numbered heating plates 8, 10 and 12 and transfer them down to the level of the odd-numbered heating plates 9, 11 and 13.

In this way a container of frozen products to be dried begins its journey by being pushed from the entrance airlock on to the right hand end of the first heating plate 7, then gradually progresses along the path defined by all the heating plates in series until it reaches the left hand end of the last of the odd-numbered heating plates 13.

Figure 4:
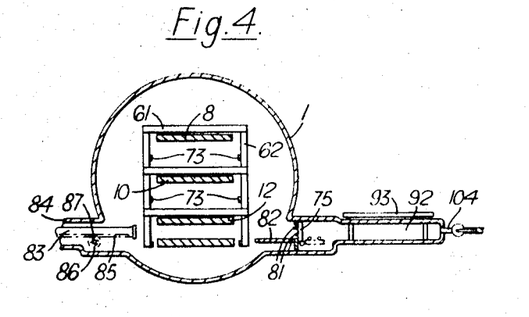
FIG. 4 is a section on line IV—IV of FIG. 2 similar to FIG. 3 and showing the arrangement of the exit airlock.

The exit airlock 5 (FIGS. 1 and 4) is constructed in a similar manner to the entrance airlock 4 and communicates with the inside of the vacuum chamber 1 through an outlet 74 which is normally closed by a sealing flap door 75, of similar construction to the door 23, which is mounted on a pivot rod 76 which passes through a sealing bearing 77 in the shaped side wall 78 of the exit airlock. The pivot rod 76 is connected by a lever 79 to the piston rod of another hydraulic motor indicated at 80 which is operable to raise and lower the flap door 75. As shown in FIG. 4 there are rollers 81 on the inside surface of the flap door 75 and a container runs on these rollers as it is pushed off the heating plate 13 and over a support apron 83 and into the exit airlock 5.

Another push bar arrangement is provided to push a container off the heating plate 13 and in to the exit airlock. This push bar arrangement is arranged in the vacuum chamber directly opposite the entrance 74 to the exit airlock. The push rod 83 of this push bar mechanism is housed in a casing 84 fixed in to the wall of the vacuum chamber 1. The push rod 83 has teeth on its lower surface as shown at 85 which form a rack engaging a pinion 86 mounted on a shaft 87 which extends through a sealing bearing 88 in the side wall of the casing 84 and is driven through gears 89 by a hydraulic motor 90. At its inner end the push rod 83 carries a pusher plate 91 which engages a container when the rod moves inwardly and pushes the container over the apron 82 and the flap door 75 and into the exit airlock 5.

In a side wall of the exit airlock there is a flap door 92, of similar construction to the door 17, through which the containers of dried products are extracted from the airlock. The door 92 is fixed to a pivot shaft 93 connected by a lever 94 to the piston rod of a further hydraulic motor 95 which is operable in one direction to lower the flap door 92 to permit a container indicated at 96 to be pushed out of the airlock 5 by yet another pusher mechanism. This pusher mechanism includes a pusher 97 which engages the container 96 and which is mounted on one end of a push rod 98 with teeth in its lower surface driven by a pinion 99 connected through a sealing bearing 100 to gears 100a which are driven by a hydraulic motor 101.

The exit airlock also has an outlet 102 closed by a sealing valve 103 and which communicates only with the ambient atmosphere. Also there is an outlet 104 sealed by a valve 105 and connected to the vacuum equipment.

When a container 96 is being pushed out of the airlock through the lowered door 92, the door 75 and the valve 105 are closed. After the container has been removed the door 92 is closed and the outlet 102 which was open to the outside atmosphere is also closed.

The valve 105 is opened so that vacuum is then applied to the airlock and when the air has been evacuated from the airlock the motor 80 is operated to pivot the flap door 75 downwardly so that the exit airlock is again in communication with the vacuum chamber 1. A container of dried products is then pushed by the pusher plate 91 from the heating plate 13 into the airlock over the apron 82 and the door 75 and the motor 80 is then reversed to close the door 75 and maintain it in sealing engagement with the outlet 74. Then the valve 105 is closed and the sealing valve 103 is opened to release the vacuum. The flap door 92 is then lowered again and the motor 101 is operated to actuate the push rod 98 which pushes the container out over the flap door 92. The door 92 is again closed and the cycle repeated for the removal of the next container from heating plate 13.

The operation of the exit airlock 5 is synchronized with the operation of the entrance airlock 4 in such a manner as to ensure the removal of containers of dried products at the same time interval as the introduction of containers of frozen products into the vacuum chamber. Also the operation of the push bar mechanisms are synchronised with the operation of the airlocks so that there is a continual movement of containers along the heating plates at regular time intervals corresponding to the period of operation of the airlocks. In order to effect this required sequence of operations the hydraulic motors 20, 27, 38, 53, 60, 80, 90, 95 and 101 are all connected through appropriate spool valves in known manner by pressure fluid supply lines to a central control device, indicated at 120 in FIG. 1, which automatically controls the operation of these motors at the correct times to control the sequence of operations described above.

While reference has been made to hydraulic motors, this is by way of illustration only and other driving means such as compressed air motors or electric motors may be used.

The time interval between the introduction of successive containers into the vacuum chamber, which is the same interval as that between removal of successive containers through the exit airlock, depends on the speed of drying of the product in given conditions and the number of containers which can be accommodated on the heating plates inside the vacuum chamber.

In the embodiment described there are seven heating plates on each of which twelve containers can be accommodated. That is a total of eighty four containers are supported inside the vacuum chamber at any time.

The time required to dry a frozen product is for example 9 hours so that the time intervals at which containers can be introduced into the entrance airlock 4 is every 6½ minutes. That is the output of the apparatus is approximately 9 containers per hour and as each container will carry a load of, for example, 20 pounds of frozen products about 180 pounds per hour of products can be processed by the plant.

The evaporative capacity of the apparatus may vary, being determined by the dimensions of the containers and also of the heating plates, and by the number of containers which are sent per unit of time through the apparatus, as well as the amount of the load of products in each container.

The number of containers which can be fed per hour into the apparatus is limited by the time required to operate the airlocks and the push bar mechanisms. A minimum time of 1 or 2 minutes may be required to complete the cycle of movements, that is to introduce a container into the plant and to remove a container of dried products from the plant. The amount of the load per container depends on the size and type of the container. Usually the containers are trays with parallel partitions. Alternatively flat open trays may be used.

The containers may each contain 5 or up to 50 pounds or more of material per container so that the production capacity of the apparatus may vary between 150 to 1,500 pounds of material per hour. This capacity can be increased by introducing more than one container at a time into the apparatus and corresponding removal of the same number of containers at the same time from the vacuum chamber. In order to effect this the entrance and exit airlocks are made wider in order to accommodate say two or three trays. The length of the airlock remains the same and corresponds to the length of the containers used but the push bar mechanisms are arranged to push the containers in pairs or groups of several containers into and out of the airlocks and along the heating plates.

The trays sit closely on the heating plates and are heated by conduction and radiation from these plates. In the embodiment described above the containers remain in thermal contact with the plates as they are pushed along the plates, the flat bottoms of the containers sliding on the plates. Friction may cause difficulty, however, if the containers are large and have a heavy load and in order to assist the movement of the containers along the heating plates the apparatus may be modified in various ways. One modification is illustrated in FIG. 9.

Figure 9:
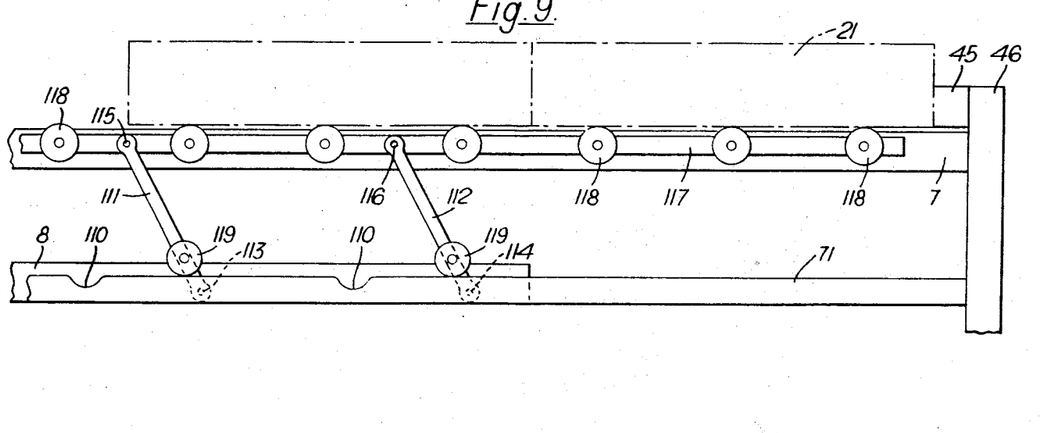
FIG. 9 is a side elevation of part of a modification of the apparatus of the invention for assisting the movement of containers of products to be dried along the heating plates.

FIG. 9 shows the protruding end of the first heating plate 7 as well as the set back end of the second heating plate 8. The actuating arms 71 have notches 110 in their upper surfaces and pivoted to the end of the heating plate 8 there are two links at each side of the heating plate. These links are shown at 111 and 112. The links are pivoted to pivots 113 and 114 on the plate 8 and are also connected to pivots 115 and 116 on a horizontal support arm 117 which are carried at either side of the heating plate 7. On the support arm 117 there are a series of rollers 118 which are normally below the level of the top surface of the heating plate 7.

When the push rod 48 is retracted the cam rollers 119 on the links 111 and 112 sit in the notches 110 so that the rollers 118 are below the level of the top surface of the heating plate.

When the push rod 48 is actuated and moves inwardly the rollers 119 move out of the notches onto the top surface of the actuating arm 71 so that the links 111 and 112 pivot and the rollers 118 are pushed above the level of the top surface of the heating plate. The containers are of such dimensions that they extend at each side beyond the sides of the heating plate so that the under surface of the containers is engaged by the rollers 118 and as the containers 21 are pushed along by the push bars 45 acting against the ends of the containers, the containers are lifted off the heating plate 7 onto the rollers 118 and so easily roll along. As soon as the push bar mechanism stops and the rod 48 is retracted the cam rollers 119 move back into their notches 110 and the containers 21 sink down again onto their flat bed contact with the top of the heating plate. The containers remain in this good thermal contact with the heating plate until the next operation of the push bar when a further container has to be pushed into the vacuum chamber from the entrance airlock.

The time during which the containers 21 are lifted by the rollers 118 and lose thermal contact with the heating plates is very short, for example to the order of a few seconds, and has no practical effect on the maintenance of a required temperature of the containers of frozen products. The drying time is not altered by the use of this modification and the output of the plant per hour is the same as in the case where the containers slide over the heating plates as they are advanced along the continuous path.

Usually the containers which are placed in the entrance airlock already contain frozen products which have been frozen by a known procedure. Alternatively the unfrozen products in the trays may be directly placed in the entrance airlock and the freezing of the products may be effected inside the entrance airlock either by means of refrigerating elements which contact the containers in the airlock, or by evaporative freezing. When the vacuum is applied to the entrance airlock there is a partial evaporation of water from the unfrozen product which induces the freezing of the product.

In the embodiment described above, by way of example the path of the containers is from the uppermost heating plate to the lowermost. In another emboriment the containers travel upwardly from the lowest to the highest plate. The temperature of the plates is then controlled to determine a temperature gradient along the path of travel of the containers so that their temperature decreases from the lowest to the highest plate. An advantage of such an alternative arrangement is that when the products in the containers are driest they do not have a hotter heating plate above them so that the possibility of their being scorched is decreased.

Such an alternative path for the containers also makes the transfer devices, for moving the containers from one heating plate to another, easier to design, and the actuating arms for the transfer mechanism do not have to extend the full length of the heating plates.

Figure 10:
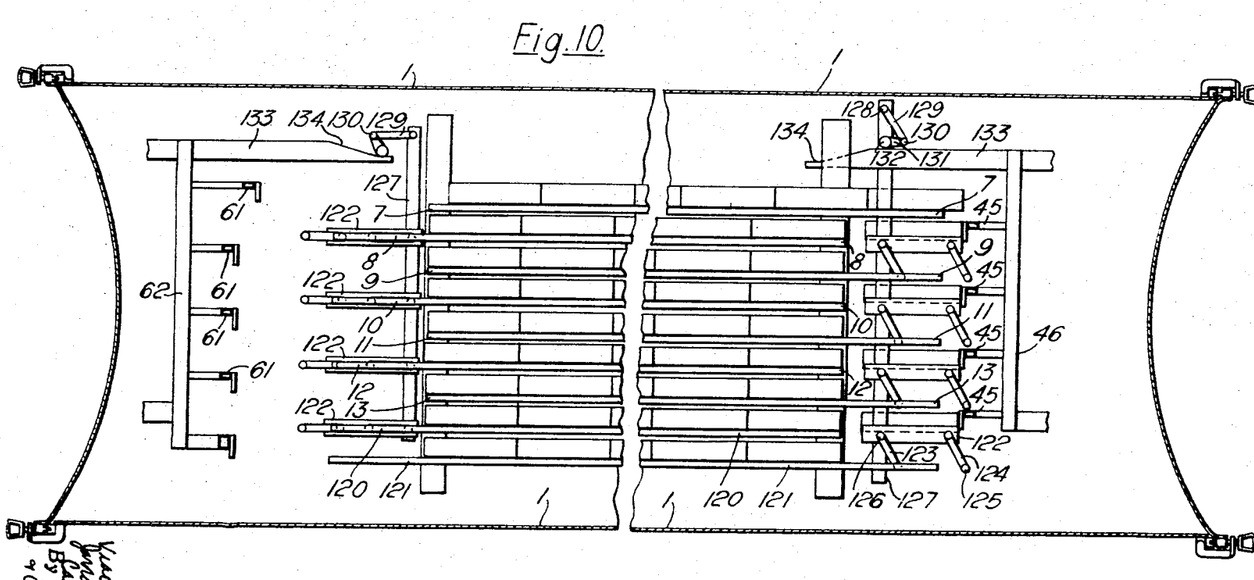
FIG. 10 is a side elevation showing transfer devices for lifting containers from the level of the lower heating plates to the plates above, when the path of the containers is from the lowermost to the uppermost heating plate.

In the embodiment of the invention illustrated in FIG. 10 there are nine heating plates, that is the seven heating plates 7 to 13 of the embodiment just rescribed are supplemented by two additional lower heating plates 120 and 121.

Mounted on the protruding ends of the plates 9, 11, 13 and 121 there are transfer devices similar to those illustrated in FIG. 8. Each transfer device comprises a container support frame 122 which is connected to the protruding end of one of the heating plates by a pivoted link 123, and is connected by a pivoted link 124 to a fixed pivot 125 inside the vacuum chamber 1. The mounting of the four transfer devices at each end of the vacuum chamber is identical. At the right hand side of FIG. 10 the transfer devices 122 are shown in the raised position and at the left hand side they are shown in the lower position in which they lie on top of the heating plates to which they are pivotally linked.

The links 123 pivot about pivots 126 on the frames 122 and at either side of the heating plates the pivots 126 are fixed into actuating battens 127. One of these battens is shown at each end of the construction of FIG. 10. Near the top of the batten 127 there is a pivot pin 128 to which is connected one end of an arm 129 of an L-shaped link which pivots about a fixed pivot 130 and whose shorter arm 131 carries a roller 132 which runs on the upper surface of a bar 133. There are two such bars at either end of the vacuum chamber, one at each side of the heating plates, and at their outer enrs the bars 133 are fixed to side struts 46 which also carry the push bars 45. The near end of each of the bars 133 has a sloping surface indicated at 134. When the actuating mechanism is retracted to the position illustrated at the left hand side of FIG. 10 the roller 132 is near the bottom of this sloping surface 134 and all the transfer frames 122 lie on their heating plates. When a container has been pushed onto each of the frames 122, movement of the bars 133 inwardly causes the rollers 132 to run up the slopes 134, thereby raising the battens 127, which bring the transfer frames 122 into their raised positions as shown at the right hand end of the FIG. 10. Continued inward movement of the struts 46 by the actuating mechanism causes the push bars to engage the raised containers which are pushed onto the heating plates and push containers off the opposite ends of the heating plates onto the lowered transfer devices. Then retraction of the struts 46 and the arms 133 causes the support frames to fall to the level of the heating plates to which they are connected ready for receiving the next containers pushed along those heating plates.

Figure 11:
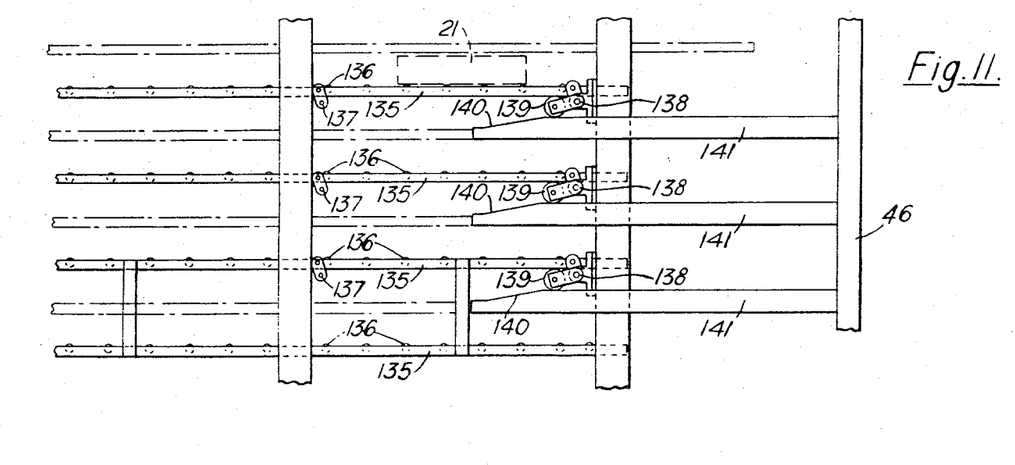
FIG. 11 is a side elevation of the apparatus of FIG. 10 but showing apparatus for assisting movement of containers along the heating plate when the containers are introduced on to the lowermost plate.

In order to assist movement of the containers along the heating plates the embodiment of FIG. 10 may be further modified as illustrated in FIG. 11. At either side of each heating plate are positioned bars 135 each carrying a series of rollers 136. Normally these rollers are below the level of the top surface of the appropriate heating plate. Each bar 135 is pivotally mounted at 137 and 138 in relation to its heating plate. The pivotal mounting 138 is part of a double arm lever and one arm carries a cam roller 139 which co-operates with a cam surface 140 on an actuating arm 141. Movement of the arm 141 as the side struts move inwardly causes the rollers 136 to be raised above the top surface of the heating plates so that the containers can be easily pushed along the heating plates by the push bars 45.

It is possible to arrange for the containers to move in a spiral path and through a path comprising a series of loops.

The invention thus provides a new apparatus for the freeze drying of frozen products which enables products to be freeze dried by a completely continuous process without a batch handling operation being necessary. The output from the apparatus is much higher than that achieved in any previous apparatus and brings the continuous freeze drying of foodstuffs into the realm of commercial possibility.

We claim:

1. Apparatus for the continuous drying of frozen products in containers comprising a vacuum chamber through which the containers are advanced from an entrance airlock to an exit airlock, there being outlets from the chamber for connection to vacuum and vapour condensing equipment, a series of parallel heating plates extending through the chamber for supporting the containers which plates are fixed one above the other to define a tortuous path in the chamber along which the containers are pushed, and transfer devices mounted relative to the ends of the heating plates and each operable to transfer a container from one heating plate to the next plate in said path after a container has been introduced into the chamber.

2. Apparatus according to claim 1, wherein the entrance airlock is located opposite one end of the topmost plate, and the exit airlock is located opposite the other end of the lowermost plate.

3. Apparatus according to claim 1, wherein the entrance airlock is located opposite one end of the lowest plate, and the exit airlock is located opposite the other end of the topmost plate.

4. Apparatus according to claim 1, wherein the path along which the containers move extends along each plate and down to the next lower plate, and wherein the transfer devices comprise supports for the containers respectively mounted at alternate ends of the heating plates except the first plate, each transfer device being operable to raise its support to the level of the end of the next upper plate to receive a container conveyed from the end of that plate onto the support, and then to lower the support with the container to the level of the heating plate at which the transfer device is mounted.

5. Apparatus according to claim 1, wherein the movement of the containers is from the lowermost heating plate to the uppermost, each transfer device includes a container support frame connected at both sides to a heating plate by pivoted links and at each end of the vacuum chamber all the support frames are connected together by a batten which is pivotally connected to a linkage rotatable about a fixed pivot and carrying a cam roller which engages a cam surface on an actuating arm connected to the push bar actuating means at that end of the chamber, which cam surface has a sloping portion arranged to cause, through said linkage, the raising of the batten thereby raising all the support frames to the level of the plates above prior to the pushing of containers from the support frames onto the heating plates by the push bars.

6. Apparatus according to claim 1, wherein each airlock has two sealing doors respectively sealing the airlock from the ambient atmosphere and from the interior of the vacuum chamber, and outlets with sealing valves, one for connection to the vacuum equipment, and the other for opening the airlock to the ambient atmosphere and including a push bar mechanism inside the entrance airlock, which mechanism is operable from outside the airlock, when the airlock is evacuated and the communicating door is opened, to push a container in the airlock onto the first heating plate in the vacuum chamber.

7. Apparatus according to claim 1, including refrigerating means in the entrance airlock to freeze products in a container before the container is conveyed into the vacuum chamber.

8. Apparatus according to claim 4, including first and second sets of push bars mounted inside the chamber at opposite ends of the chamber, the first set of push bars being arranged to engage containers on the first and subsequent odd-numbered heating plates, and the second set being arranged to engage containers on the second and subsequent even-numbered heating plates, and operating means outside the chamber for operating both sets of push bars alternately in sequence.

9. Apparatus according to claim 8, wherein said first set of push bars includes actuating members engaging the transfer devices on the even-numbered heating plates in order to raise their container supports to the level of the ends of the odd-numbered heating plates before said first push bars engage the containers on the odd-numbered plates, and said second set of push bars includes actuating members engaging the transfer devices on the odd-numbered heating plates to raise their container supports to the level of the ends of the even-numbered heating plates before said second set of push bars engage the containers on the even-numbered plates.

10. Apparatus according to claim 9, wherein the heating plates are all of equal length and are mounted in staggered relation so that the ends of the even-numbered heating plates all protrude beyond the ends of the odd-numbered heating plates at one end of the chamber and the protruding end of each of the plates, except the first, has one of said transfer devices mounted on it so that the container support of each transfer device can be raised and lowered between the level of the heating plate to which it is connected and the level of the plate above.

11. Apparatus according to claim 10, wherein each transfer device includes a container support frame connected at both sides to a heating plate by pivoted links, one link at each side carries a cam roller for engagement by cam surfaces at the ends of actuating members extending along the sides of said heating plate, and including means for advancing the members in order to raise the support frame to the level of the plate above prior to the pushing of the containers along that plate, and for retracting the members to lower a container to the level of the plate to which the support frame is linked.

12. Apparatus according to claim 11, wherein the movement of the containers is from the uppermost heating plate to the lowermost, the actuating members engaging the transfer devices on the odd-numbered heating plates are connected to the set of push bars for the even-numbered heating plates, and the actuating members engaging the transfer devices on the even-numbered heating plates are connected to the set of push bars for the odd-numbered heating plates, the cam surfaces on the actuating members being arranged so that lifting of the support frames is completed before the push bars engage the containers.

13. Apparatus according to claim 11, including arms extending along both sides of each heating plate and connected by parallel linkages to the plate below, support rollers mounted on the arms, a cam roller on each link of the linkages, and cam surfaces formed on said actuating members to engage said cam rollers and move the linkages so that upon operation of the appropriate set of push bars the support rollers are raised above the level of the top surface of the heating plate and lift containers off the heating plate before they are pushed along by the push bars.

14. Apparatus according to claim 6, including a second push bar mechanism mounted in the vacuum chamber opposite to the exit airlock and operable from outside the chamber, when the exit airlock is evacuated and the communicating door is open, to push a container of dried products off the last heating plate into the exit airlock.

References Cited

UNITED STATES PATENTS

| | | | |
|---|---|---|---|
| 2,441,021 | 5/1948 | Heineman | 34—92 |
| 2,751,687 | 6/1956 | Colton | 34—5 |
| 3,192,645 | 7/1965 | Oetjen | 34—92 |
| 3,234,661 | 2/1966 | Nerge | 34—92 |
| 3,273,259 | 9/1966 | Hackenberg | 34—92 |
| 3,289,314 | 12/1966 | Porta | 34—92 |
| 3,354,609 | 11/1967 | Nerge | 34—92 |

WILLIAM J. WYE, Primary Examiner

U.S. Cl. X.R.

34—44, 236